(12) United States Patent
Erikson et al.

(10) Patent No.: US 10,744,695 B2
(45) Date of Patent: Aug. 18, 2020

(54) POLYMER COMPOSITES FOR FUSED FILAMENT FABRICATION AND METHODS OF MAKING THE SAME

(71) Applicant: BATTELLE MEMORIAL INSTITUTE, Richland, WA (US)

(72) Inventors: Rebecca L. Erikson, Richland, WA (US); Josef F. Christ, Pasco, WA (US); Zachary C. Kennedy, Richland, WA (US); Kent A. Evans, San Jose, CA (US); Christopher A. Barrett, Richland, WA (US); Satish K. Nune, Richland, WA (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 266 days.

(21) Appl. No.: 15/874,062

(22) Filed: Jan. 18, 2018

(65) Prior Publication Data

US 2019/0217517 A1    Jul. 18, 2019

(51) Int. Cl.
| | |
|---|---|
| *B29C 48/05* | (2019.01) |
| *C08K 5/3445* | (2006.01) |
| *B33Y 70/00* | (2020.01) |
| *C08J 9/26* | (2006.01) |
| *C08J 9/00* | (2006.01) |
| *C08K 5/00* | (2006.01) |
| *B29K 67/00* | (2006.01) |
| *B29C 64/118* | (2017.01) |

(52) U.S. Cl.
CPC ............. *B29C 48/05* (2019.02); *B33Y 70/00* (2014.12); *C08J 9/0066* (2013.01); *C08J 9/26* (2013.01); *C08K 5/0091* (2013.01); *C08K 5/3445* (2013.01); *B29C 64/118* (2017.08); *B29K 2067/046* (2013.01); *C08J 2375/04* (2013.01)

(58) Field of Classification Search
CPC .......................... B29C 64/386; Y10S 977/956
See application file for complete search history.

(56) References Cited

U.S. PATENT DOCUMENTS

2017/0189866 A1*  7/2017  Koros ................ B29C 48/2545

OTHER PUBLICATIONS

Moreton, J.C., Denny, M.S. and Cohen, S.M., 2016. High MOF loading in mixed-matrix membranes utilizing styrene/butadiene copolymers. (Year: 2016).*

(Continued)

*Primary Examiner* — Leith S Shafi
*Assistant Examiner* — Nicholas R Krasnow
(74) *Attorney, Agent, or Firm* — Derek H. Maughan

(57) ABSTRACT

Disclosed are compositions of a fused filament fabrication (FFF) composite filament having embedded functional materials in a thermoplastic matrix. Methods of making the composite filaments are also disclosed. In one example, a FFF composite filament incorporates a MOF, in an amount greater than 10% by mass, dispersed in a matrix polymer. One example of a method of synthesizing FFF composite filaments involves mixing a suspension that has a MOF with a matrix polymer solution to yield a polymer-MOF mixture. The mixture is cast and dried into a solid composite material, which is formed a FFF composite filament having the MOF in an amount greater than 10% by mass.

12 Claims, 14 Drawing Sheets

(56) References Cited

OTHER PUBLICATIONS

Channell, M., Analysis of MOF-5 With ABS and PLA for Uses in Additive Manufacturing, American University, Washington D.C., 2015.

Kreider, M. C., et al., Toward 3D printed hydrogen storage materials made with ABS-MOF composites, Polymers Advanced Technologies, Apr. 1-7, 2017.

Thakkar, H., et al., 3-D-Printed Zeolite Monoliths for $CO_2$ Removal from Enclosed Environments, ACS Applied Materials & Interfaces, Aug. 2016, 27753-27761.

Thakkar, H., et al., 3D-Printed Metal—Organic Framework Monoliths for Gas Adsorption Processes, ACS Applied Materials & Interfaces, Sep. 2017, 35908-35916.

* cited by examiner

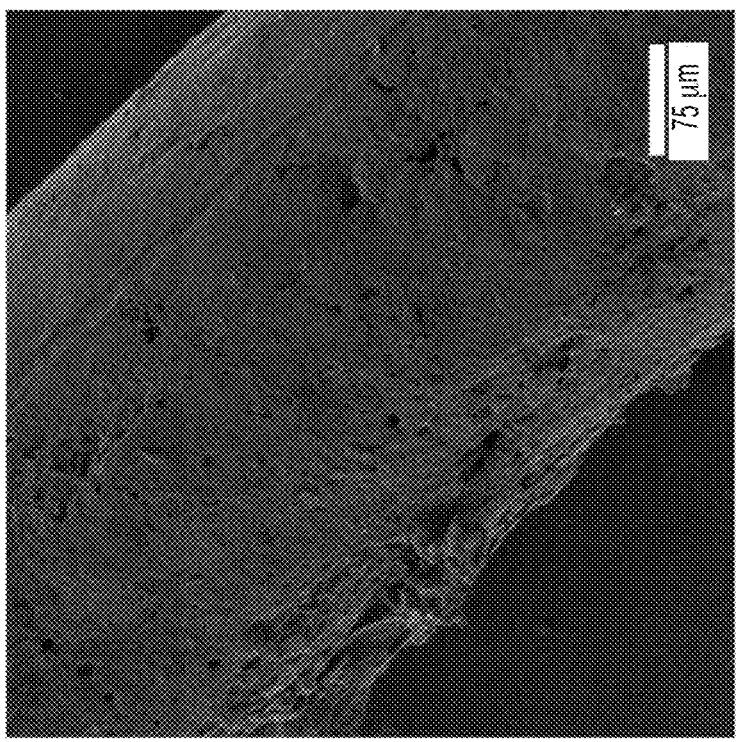
FIG. 10B  + 10 min ACETONE TREATMENT
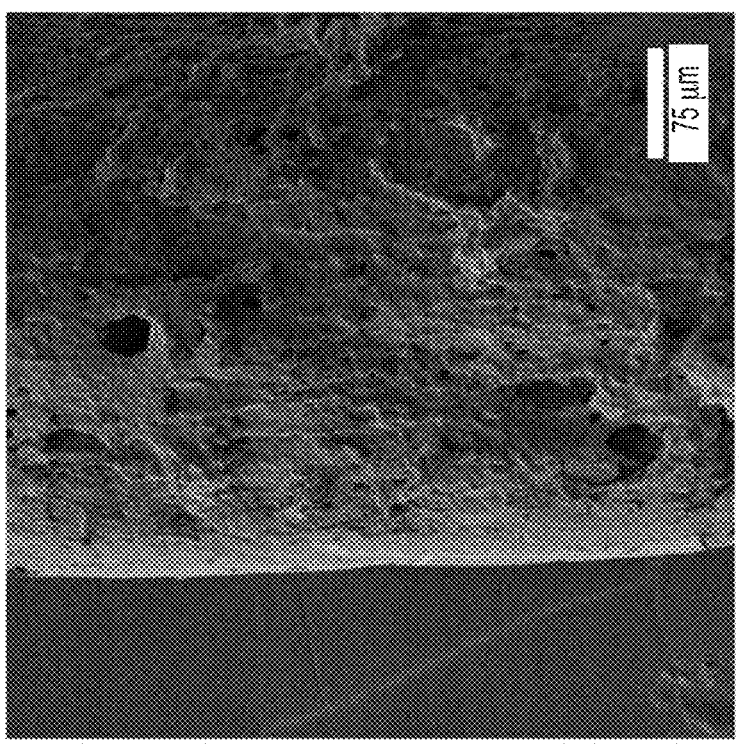
FIG. 10A  (40:40:20)-SEMIFLEX/ZIF-8/PVDF-HFP, 400 μm

POLYMER COMPOSITES FOR FUSED FILAMENT FABRICATION AND METHODS OF MAKING THE SAME

ACKNOWLEDGEMENT OF GOVERNMENT SUPPORT

This invention was made with Government support under Contract DE-AC0576RL01830 awarded by the U.S. Department of Energy. The Government has certain rights in the invention.

FIELD

The present disclosure relates generally to engineered porous materials for 3D printing and particularly to chemically functional, polymer composite filaments for fused filament fabrication (FFF) and to methods of making the same.

BACKGROUND

Many materials offering high surface areas and/or advantageous chemical or electrical functionality are not widely utilized because they are difficult to handle and/or are not convenient to manufacture into usable forms. For example, with their remarkably high theoretical surface areas (14,600 $m^2/g$) and vast potential for structural tunability, metal-organic frameworks (MOF) and their functionalized analogues can exhibit truly unique adsorption properties for gas/vapor systems, including high capacities and tailored selectivity. Applications can include toxic gas storage/separation, chemical sensing, catalysis, energy storage, heating and cooling, water management, efficient contrast imaging agents (acoustic, MRI etc.) and targeted extraction of critical metals from geothermal brines. However, conventional synthesis strategies for MOFs generally result in the formation of either dry powder products, with exceptionally low density, or colloidal suspensions. These inconvenient forms have limited their use to niche application spaces. More widespread industrial use of MOFs will continue to be limited given the poor mechanical strength and the difficulties faced with handling and processing these powders into useable form factors. Attempts to address the challenge have typically compromised the advantageous material properties that make MOFs attractive. Accordingly, there is an explicit and growing need for feedstock compositions and methods of making same that enable the production of engineered forms of MOF-based materials so that 3D objects of any desired shape or geometry can be realized.

SUMMARY

Disclosed are compositions of a fused filament fabrication (FFF) composite filament comprising embedded functional materials in a thermoplastic matrix. Methods of making the composite filaments are also disclosed. Examples of functional materials can include, but are not limited to, carbon nanotubes, porous carbons, silica, zeolites, covalent organic frameworks, and other porous materials. In certain embodiments, the functional material comprises a MOF. The inventors have determined that using methods of making described herein can yield composite filaments for use with fused filament fabrication that retain the ability to participate in chemical interactions characteristic of the functional material independent of the matrix thermoplastic. In other words, the FFF composite filaments described herein can be 3D printed via FFF to produce high-surface area, porous, chemically active, items. FFF is often used interchangeably with fused deposition modeling (FDM). FFF and FDM describe a 3D printing technique that uses a thermoplastic filament, which is heated and extruded, layer by layer, to create a three-dimensional printed item.

In some embodiments, the composition comprises a FFF composite filament comprising a MOF, in an amount greater than 10% by mass, dispersed in a matrix polymer. In some embodiments, the matrix polymer is not intended to be mostly removed in a post-process step such as heating, baking, vacuum evaporation, or sintering. In certain embodiments, the FFF composite filament comprises the matrix polymer in an amount greater than 15% by mass. In other embodiments, the FFF composite filament comprises the matrix polymer in an amount greater than or equal to 20%, 25%, 30%, 35%, 40%, 45%, 50%, 55%, 60%, 65%, 70%, 75%, 80%, 85%, or 90% by mass. In certain embodiments, the FFF composite filament comprises MOF in an amount greater than or equal to 25% by mass. In other embodiments, the FFF composite filament comprises MOF in an amount greater than or equal to 30%, 35%, 40%, 45%, or 50% by mass. In certain embodiments, the FFF composite filament comprises the MOF dispersed homogeneously in the matrix polymer.

In certain embodiments, the FFF fiber and/or items printed from the FFF filament can have a surface area greater than or equal to 250 $m^2/g$. In one example, an item printed using an FFF composite filament had a surface area of 577 $m^2/g$ after a post-print solvent exchange using methanol. In other embodiments, the surface area can be greater than or equal to 75 $m^2/g$. In one example, a common diameter for FFF filament is 400 μm. In at least 400 μm diameter composite filaments described herein, the surface area can be greater than or equal to 75 $m^2/g$. In still other embodiments, the FFF composite filament has a surface area greater than or equal to 2.5 $m^2/g$. In one example, a common diameter for FFF filament is 1.75 mm. In at least 1.75 mm diameter composite filaments and/or in 400 μm diameter composite filaments, the surface area can be greater than or equal to 2.5 $m^2/g$.

In some embodiments, the FFF composite filament comprises macroporosity. The composite filaments and/or items printed therefrom can have a hierarchical porosity. In certain embodiments, the FFF composite filament comprises mesopores in the matrix polymer and micropores in the MOF.

In certain embodiments, matrix polymers can comprise thermoplastics that can be extruded. Examples of matrix polymers can include, but are not limited to, polylactic acid (PLA), thermoplastic polyurethane (TPU), acrylonitrile butadiene styrene (ABS), nylon 12, nylon 66, polyvinylidene difluoride (PVDF), polycarbonate, or a combination thereof. In certain embodiments, the MOF comprises a MOF that is thermally stable at or above 210° C. The MOF can be a crystalline MOF (i.e., bulk MOF) or can be a nanoscale MOF. Examples of MOFs can include, but are not limited to, ZIF-08, UiO-66, MIL-101(Cr), FeBTC, or a combination thereof.

In certain embodiments, the MOF in the FFF composite filament, or in an item printed from the FFF composite filament, is chemically functional. In certain embodiments, the FFF composite filament, or the item printed from the FFF composite filament, exhibits test-dye adsorption by the MOF. The test dye demonstrates chemical functionality of the MOF in the composite when the native MOF, when not part of the composite, exhibits adsorption of the test dye. Suitable test dyes can have a molecular size that is similar to the diameter of pores in the MOF and/or can have functional groups that bond to the surface of the MOF.

In some embodiments, a method of synthesizing a FFF composite filament comprises mixing a suspension that comprises a MOF with a matrix polymer solution that comprises a matrix polymer in a matrix polymer solvent to yield a polymer-MOF mixture; casting and drying the polymer-MOF mixture into a solid composite material; and forming the solid composite material into a FFF composite filament comprising the MOF in an amount greater than 10% by mass. In certain embodiments, prior to mixing the suspension with the matrix polymer solution, a sacrificial polymer solution is mixed into the suspension, wherein the sacrificial polymer solution comprises a sacrificial polymer in a sacrificial polymer solvent and wherein the sacrificial polymer solution and the matrix polymer solution are at least partially miscible with one another. The sacrificial polymer is sacrificially removed from the FFF composite filament or from an item printed from the FFF composite filament. In certain embodiments, the step of removing comprises dissolving the sacrificial polymer with a sacrificial polymer removal solvent in which the solubility of the sacrificial polymer is greater than the solubility of the matrix polymer. In certain embodiments, the sacrificial polymer comprises a fluoropolymer.

In certain embodiments, the method can further comprise replacing at least a portion of residual solvent that remains in pores of the FFF composite filament, or an item printed from the FFF composite filament, with an exchange solvent having a boiling temperature that is less than that of the residual solvent; and evaporating the exchange solvent from the pores and activating chemical functionality of the MOF. In certain embodiments, after said evaporating, the FFF composite filament, or an item printed from the FFF composite filament, has a surface area greater than or equal to 250 $m^2/g$.

In certain embodiments, the FFF composite filament comprises the MOF in an amount greater than 25% by mass. In certain embodiments, the FFF composite filament comprises the matrix polymer in an amount greater than 15% by mass. In certain embodiments, the solid composite material comprises greater than 10% sacrificial polymer by mass. In certain embodiments, the matrix polymer comprises polylactic acid, thermoplastic polyurethane, acrylonitrile butadiene styrene, nylon 12, nylon 66, polyvinylidene difluoride, polycarbonate, or a combination thereof. In certain embodiments, the MOF comprises ZIF-8, UiO-66, MIL-101(Cr), FeBTC, or a combination thereof. In certain embodiments, the FFF composite filament has a surface area greater than or equal to 2.5 $m^2/g$.

In certain embodiments, the forming step comprises providing the solid composite material to an extruder and pressing the material through a die to yield the FFF composite filament.

The purpose of the foregoing summary and the latter abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. Neither the summary nor the abstract is intended to define the invention of the application, which is measured by the claims, nor is it intended to be limiting as to the scope of the claims in any way.

BRIEF DESCRIPTION OF THE DRAWINGS

FIG. 2A shows powder X-ray diffraction (PXRD) data as an extruded 1750 μm (diameter) filament (top) and the simulated ZIF-8 PXRD pattern (bottom) generated from single crystal data. FIG. 2B shows TGA data recorded in air of PLA, (60:40)-PLA/ZIF-8 as a 400 μm printed strand before and after activation by solvent exchange. FIG. 2C shows $N_2$ adsorption isotherms recorded at −196° C. on as printed 400 μm strands and after activation with corresponding desorption isotherms denoted with open markers. FIGS. 2D-2F are HeIM images of a 400 μm printed (60:40)-PLA/ZIF-8 strand at low magnification and higher magnifications.

(FIG. 3B) the first derivative thermogravimetric (DTG) curves of the materials in (3A) provides the rates of mass change versus temperature. The peak rate of mass loss shifted to lower temperatures, relative to pure PLA, as the ZIF-8 content increased.

(FIG. 6B) $N_2$ adsorption isotherms of printed, binary Semiflex/ZIF-8 at 400 μm diameters after activation (desorption denoted with open markers); (FIG. 6C) a schematic illustrating the flexible, ternary MOF composites after printing where PVDF-HFP occludes the MOF pores, acetone treatment to leach out a majority of the PVDF-HFP, increase exposure of the embedded framework particles, and retain the Semiflex as the base macroscale object; and (FIG. 6D) $N_2$ adsorption/desorption isotherms of ternary Semiflex/ZIF-8/PVDF-HFP 400 μm strands as printed and after acetone treatment.

(FIG. 9B) Images of the above composite after 10 min acetone treatment at the same magnifications.

FIGS. 10A-10B include low-magnification HeIM images of printed (40:40:20)-Semiflex/ZIF-8/PVDF-HFP (FIG. 10A) prior to treatment and (FIG. 10B) after acetone treatment.

(FIG. 11C) Cross-sectional secondary electron and related BSE images with corresponding EDS map of O, F, and Zn elements. (FIG. 11D) schematic of the ternary composite of same composition as in (FIG. 11A) with ZIF-8 loading increased to ~45% after acetone treatment. (FIG. 11E) HeIM image of the treated surface with representative BSE image and corresponding EDS map of Zn. (FIG. 11F) Cross-sectional HeIM of the treated object in addition to the BSE image and corresponding EDS map of Zn. Note: The Zn:F ratios in terms of avg. wt % across multiple areas (denoted by n=number of images analyzed) of the printed object at each step. EDS maps are from areas shown in the BSE images; some drift occurred between measurements.

DETAILED DESCRIPTION

Material formulation for additive manufacturing (AM) can be a critical component to the progression of the industry as it moves from novelty to a mainstream, disruptive technology. The problems associated with handling MOFs and fabricating them into useful forms that retain native MOF functionality are solved by a FFF composite filament having greater than 10% MOF by mass in a matrix polymer. The inventors have determined unexpectedly that an insufficient MOF loading in the composite filament results in poor chemical functionality. In other words, sufficiently high loadings are required to attain the functionality of the native MOF.

Disclosed herein are polymer-MOF composite materials, and methods of making the same, that are compatible with 3D printing technologies and that can retain the chemical functionality of the native MOF. The compositions and methods of making enable advanced manufacturing of MOF-based articles including, but not limited to, printable chemical sensors, functional textiles, and collection devices having complex geometry. The inventors have determined that the instant FFF composite filaments, and items printed therefrom, not only retain native MOF characteristics, such as high surface area and chemical reactivity, but also exhibit high mechanical strength and a simplification of use. FFF as a 3D printing technique differs from direct ink writing, and the composite filaments described herein differ from MOF-based slurries used in direct ink writing. 3D printing of the FFF, polymer-MOF, composite filament avoids the need for forms of invasive densification often associated with traditional MOF-related manufacturing techniques. MOF pellets, beads and membranes typically suffer from a sharp loss in total surface area, with some MOFs being completely destroyed in the process. The shapes available with conventional fabrication processes are limited and can be very fragile. For these and other reasons, MOFs are difficult to integrate with important applications such as wearable technologies.

Figure 1A:
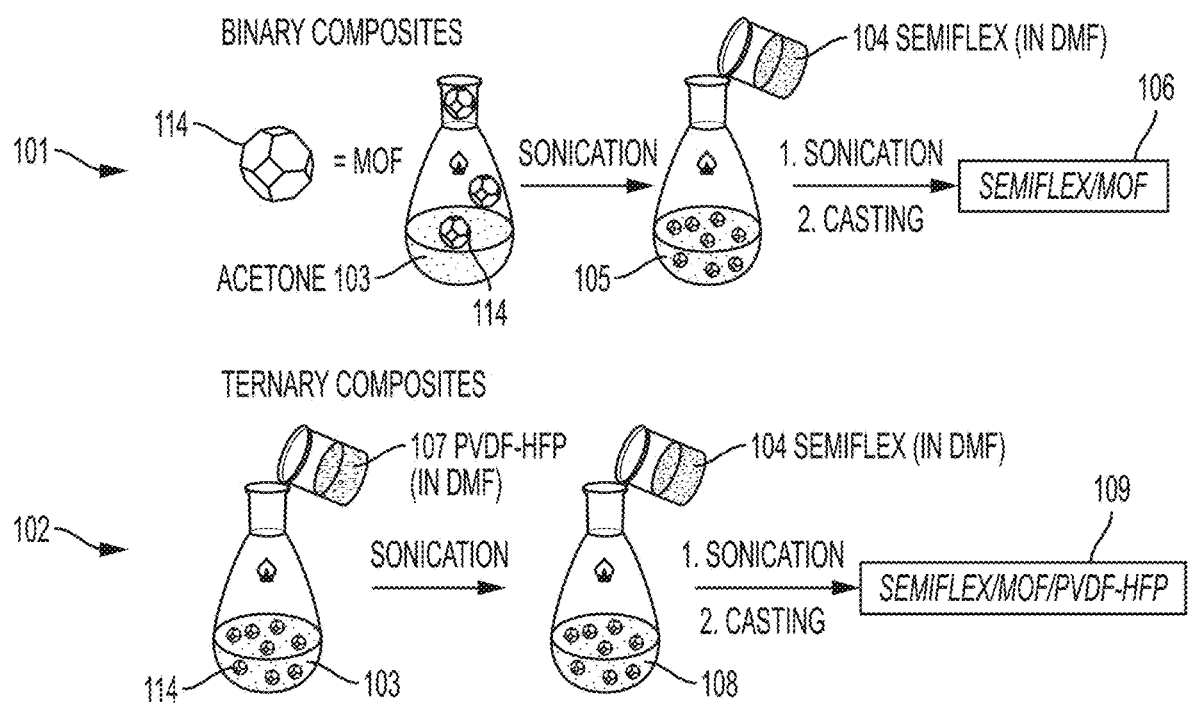
FIGS. 1A and 1B depict a flowchart summarizing a method of making FFF composite filaments beginning with suspensions (FIG. 1A) through extruding filaments from a thick film (FIG. 1B) according to embodiments described herein.
Figure 1B:
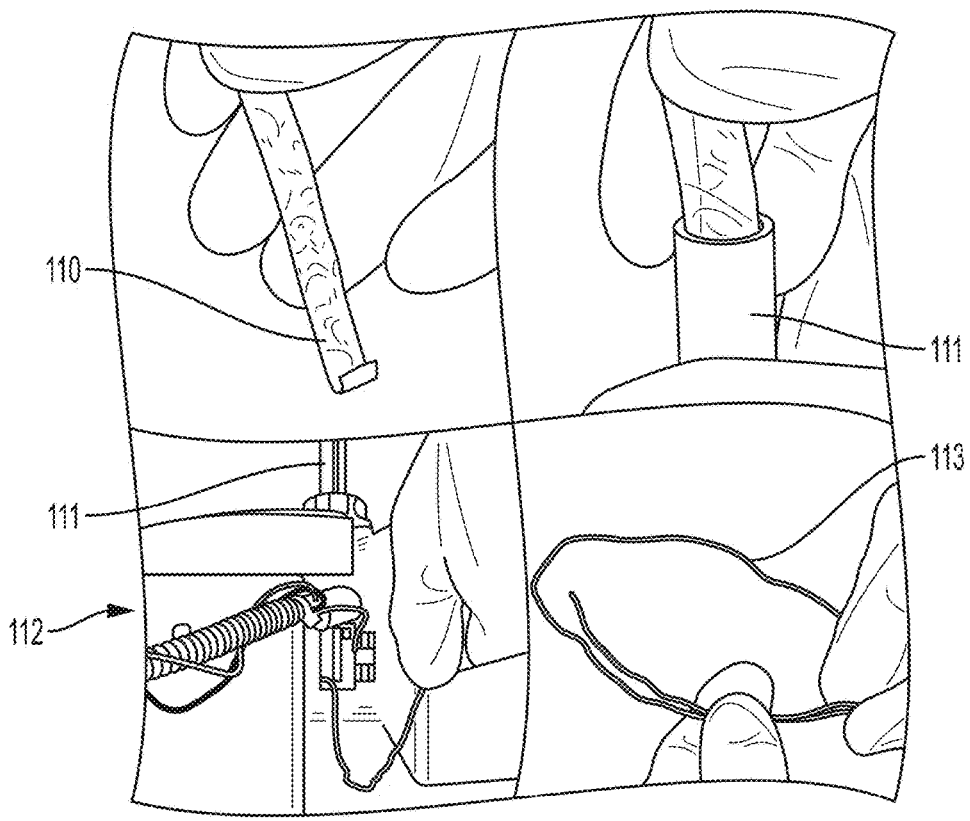

Referring to FIGS. 1A and 1B, schematics and photographs depict some embodiments for making polymer-MOF composite filaments. For embodiments involving a binary composite 101, a matrix polymer solution 104 is mixed into a suspension 103 comprising a MOF 114 to yield a polymer-MOF mixture 105. The suspension 114 can be sonicated prior to addition of the matrix polymer solution 104. The polymer-MOF mixture 105 is sonicated prior to casting and drying to yield a solid composite material 106. For composites utilizing a sacrificial polymer (e.g., a ternary composite) 102, a sacrificial polymer solution 107 is added to the suspension 103 comprising the MOF 114. The mixture comprising the MOF suspension 103 and the sacrificial polymer solution 107 can be sonicated prior to addition of the matrix polymer solution 104. The polymer-MOF solution 108 comprises the matrix polymer solution, the sacrificial polymer solution and the MOF suspension. The ternary mixture 108 is sonicated and then cast and dried into a solid composite material 109.

As illustrated in FIG. 1A, the MOF suspension comprises acetone. Alternative solvents can include, but are not limited to, ethylacetate, water, methanol, ethanol, isopropanol, butanol, dimethyl formamide (DMF), tetrahydrofuran (THF), chloroform, diethylformamide (DEF), dimethyl sulfoxide (DMSO), acetonitrile, dimethyl acetamide (DMA), N-methyl-2-pyrrolidone (NMP) or a comibination thereof. The matrix polymer solution can comprise a solvent in which the matrix polymer is soluble and which is miscible with the solvent in the MOF suspension. Examples of matrix polymer solvents include, but are not limited to chloroform, dimethylformamide, methyl ethyl ketone, 1,2-dichloroethane, dioxane, tetrahydrofuran, N-methylpyrrolidone, tetramethylurea, formic acid, m-cresol, methylene chloride, cyclopentanone, or a combination thereof. The MOF suspension can be sonicated at room temperature, but can also be heated to a temperature up to the boiling point of the solvent. Similarly, mixing the matrix polymer solution and the MOF suspension can occur at a temperature between zero and 100° C. Typically, after casting the polymer-MOF mixture, drying occurs at temperature between 20 and 100° C. and/or at a pressure less than atmospheric pressure. Drying can occur in a controlled atmosphere. For example, in an inert or noble gas. While the embodiment illustrated in FIGS. 1A and 1B describe a matrix polymer solution and a sacrificial polymer solution, embodiments described herein are not limited to three polymers. One or more of the solutions can comprise a plurality of polymers, thereby yielding a composite filament having a combination of matrix polymers. Furthermore, additional additives can be used including, but not limited to stabilizers, plasticizers, nucleating agents, lubricants, or a combination thereof.

Referring to FIG. 1B, the solid composite materials 108 and 109 are typically relatively thick films 110, which are cut and fed into a heated barrel 111. In the barrel, the cut film is pressed and extruded 112 into a composite filament 113. Typical temperature conditions for extrusion range from 170 degrees celsius to 270 degrees celsius. Depending on the base polymer and its die-swell behavior, the composite is extruded using an adequate pressure through a properly sized die orifice that is suited to producing filaments capable of being printed through and FDM printer.

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing embodiments from discussed prior art, the embodiment numbers are not approximates unless the word "about" is recited.

EXAMPLES AND COMPARISONS

To further illustrate certain embodiments of the disclosed FFF composite filaments and methods of making the same, and to provide various comparative analyses and data, below are some Examples with comparison test data.

Generally, the examples illustrate the uniform incorporation of MOFs into three dimensional objects via an additive manufacturing process and methods to enable retention of valuable framework structural and functional characteristics while also imparting robust mechanical properties from the polymeric foundation. Selection of polymer matrices with a solubility profile compatible with solutions of suspended MOFs can enable sufficient preservation of the parent polymer's thermoplastic properties for processing, spooling into filament, and printing with very high particulate loadings. Characterization of rigid and flexible classes of printed materials revealed vastly different gas adsorption properties, where a hierarchical porous internal network was observed in the former case and nearly complete pore occlusion in the latter. One remedy to this undesirable pore blockage is described involving a technique to template the MOF crystals with a sacrificial polymer additive miscible with the matrix polymer, followed by printing, then selective removal of the sacrificial polymer by chemical treatment. Access to the MOF microporous structure is restored and, consequently, the item exhibits high surface area. In each material class, the printed objects interacted with small molecule and gaseous guests in a typical fashion to free powdered (i.e., native) MOF.

3D printing and characterization of rigid polymer-MOF composites with hierarchical porosity ZIF-8 composites were processed into FFF composite filaments with PLA base polymer matrices. A PLA stock solution (0.05 g mL$^{-1}$) was prepared by dissolving PLA pellets (7.5 g) in CHCl$_3$ (150 mL) while stirring at room temperature. A typical composite with a total mass of 2 g and a ZIF-8 loading of 40% by mass was achieved first by dispersing ZIF-8 (800 mg) in ethyl acetate (10 mL) by bath sonication for 15 min. The PLA stock solution (24 mL) was then added to the MOF solution, briefly stirred (~1 min), and the mixture was sonicated by ultrasonic horn for 20 min. The resulting mixture was cast onto a Teflon dish, most of the solvents removed by placing the dish on a hot plate at 75° C., then the composite was fully dried at 75° C. for 16 h in a vacuum oven under low vacuum to obtain a thick film.

Figure 2A:
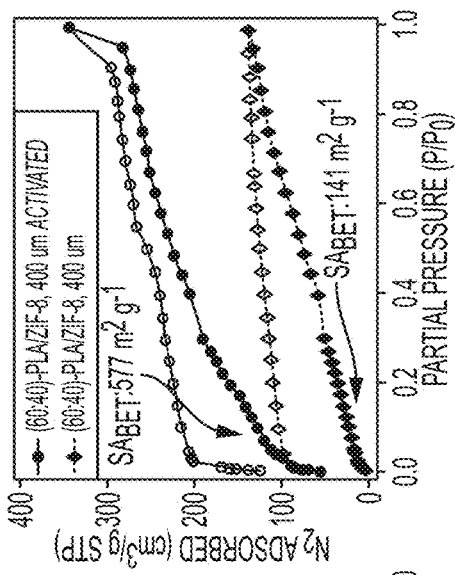
FIGS. 2A-2F includes experiment data and micrographs concerning a (60:40)-PLA/ZIF-8 composite filament.

In one instance, PLA/ZIF-8 composites were obtained by suspending ZIF-8 in ethyl acetate (EtOAc) by sonication, followed by addition of a dilute PLA solution (0.05 g/mL in CHCl$_3$) to the MOF suspension. After additional sonication, the mixtures were cast and dried. The resulting thick films were cut, fed into a heated (185° C.) barrel of an extruder, and pressed through a die to yield composite filaments with diameters of approximately 1750 μm. Filaments were prepared with up to 40% ZIF-8 loading by mass with no flaking or powdering of the MOF upon visual inspection suggesting good adhesion to the PLA matrix. By comparison, the direct addition of ZIF-8 powder into polymer solutions resulted in large aggregation of ZIF-8 and clumping within the polymer matrix regardless of subsequent extended sonication treatments. Structural analysis of the (60:40)-PLA/ZIF-8 filament feedstock (1750 μm diameter) by powder X-ray diffraction (PXRD) confirmed that the ZIF-8 framework retained a very high crystallinity after the processing steps (FIG. 2A).

Figure 2B:
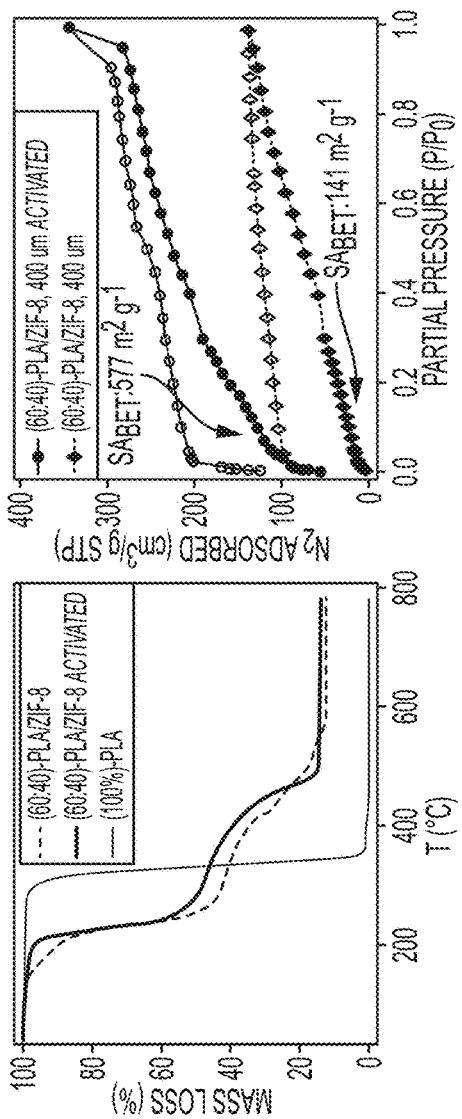

The PLA filaments were then used to FDM-print materials, in the form of 400 μm cylindrical strands as a standardized geometry, for further characterization of the physical characteristics of the embedded MOFs in the composites. Thermogravimetric analysis (TGA) measurements recorded in air on printed (60:40)-PLA/ZIF-8 (FIG. 2B, dashed pink trace) featured a significant mass loss (10.4%) from 100-200° C., expected to be a result of EtOAc and CHCl$_3$ guest solvent molecules retained in the pores of the filament even after extensive drying. It is established that ZIF-8 can retain trapped solvent molecules in its pores at temperatures exceeding the boiling points of the guest molecules. To test this hypothesis, a printed ZIF-8 composite was "activated" by first soaking the sample in CH$_3$OH (as an exchange solvent) for 48 hours to facilitate exchange of these solvents with easier to remove CH$_3$OH molecules. The solution was then removed and the sample was dried in a low vacuum oven at 75° C. (minimum 3 hours) prior to further analysis.

Figure 3A:
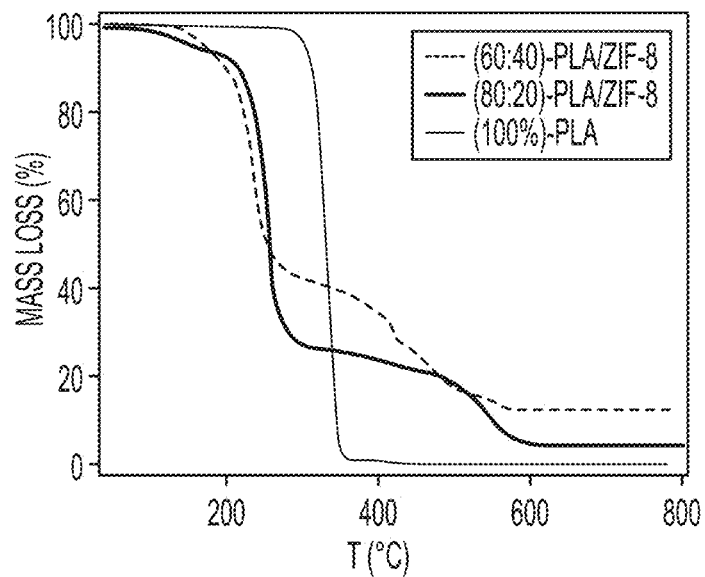
FIGS. 3A and 3B show (FIG. 3A) TGA traces recorded in an air atmosphere at 5° C. min−1 of 400 μm diameter printed (60:40)-PLA/ZIF-8, (80:20)-PLA/ZIF-8, and (100%)-PLA materials.
Figure 3B:
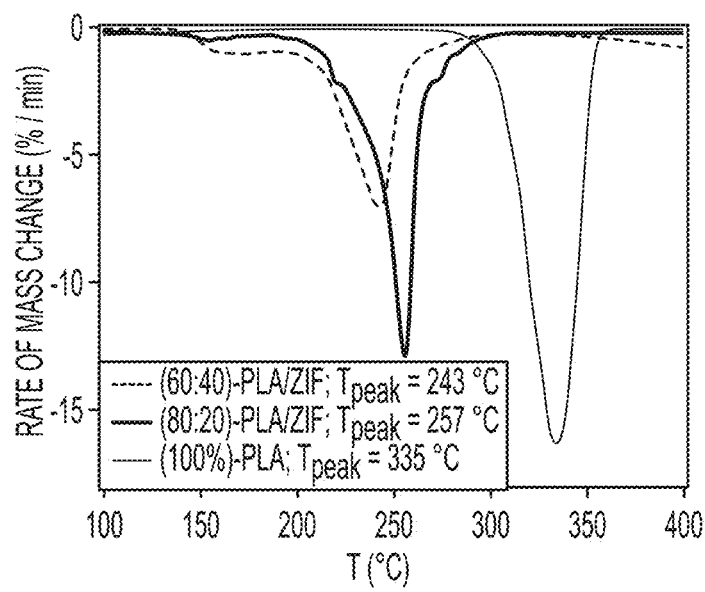

PLA is insoluble in CH$_3$OH, therefore no morphological changes were observed in the test object. The TGA trace for the activated (60:40)-PLA/ZIF-8 composite (FIG. 2B) significantly reduced the mass loss observed, relative to the as printed sample, to 3.0% (from 100-200° C.) which indicated successful exchange. Of note, a remarkable decrease in the thermal stability (in air) of the PLA matrix from a decomposition onset of ~293° C. in pure PLA to ~200° C. for both as-printed and activated composites was also observed. The thermal stability of PLA in air was found to correlate with the concentration of ZIF-8, where increased ZIF-8 significantly reduced the stability (FIGS. 3A and 3B). ZIF-8 particles are proposed to act as heterogeneous catalysts for the hydrolysis of PLA, which therefore reduces the thermal stability. As the extrusion and printing processes only expose the composites to elevated temperatures for short time intervals (typically less than 3-5 minutes at 185° C.; and 30 seconds up to 200° C., respectively), the decomposition of PLA is not expected to occur to an appreciable extent when printing. Importantly, the thermogravimetric behavior of the composite suggests the MOF pores remain accessible to guest molecules as validated by their ability to undergo solvent exchange.

Figure 2C:
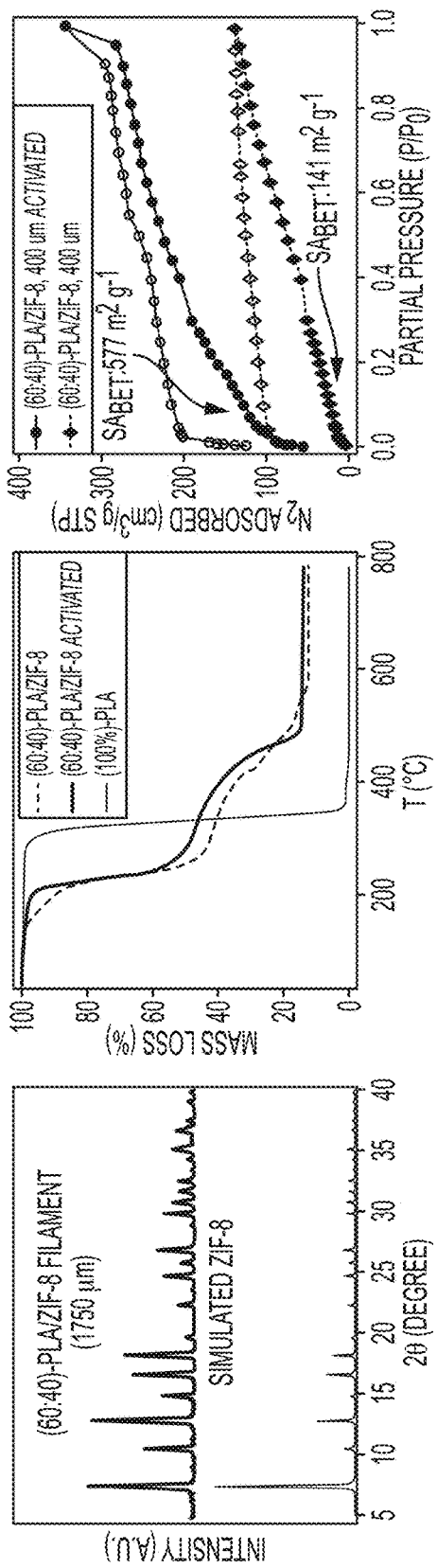
Figure 5A:
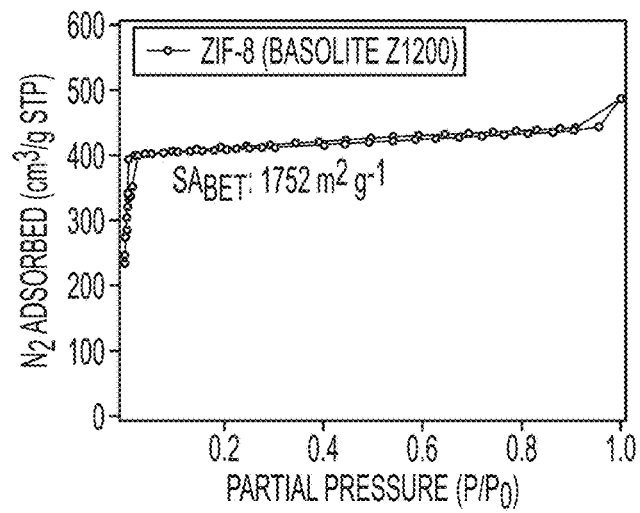
FIGS. 5A-5C include Nitrogen adsorption isotherms recorded at −196° C. for (FIG. 5A) pure ZIF-8 powder (Basolite Z1200), (FIG. 5B) (60:40)-PLA filament feedstocks (with diameter of 1750 μm) before and after activation, and (FIG. 5C) as-printed samples with varied loadings of ZIF-8 (0-40%) at 400 μm diameter.
Figure 5B:
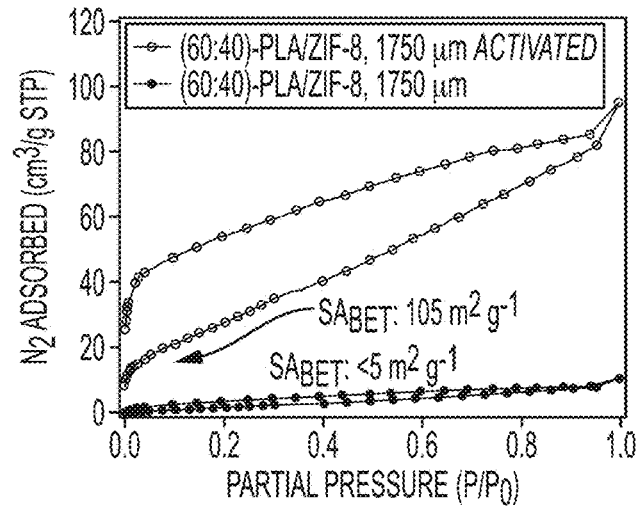
Figure 5C:
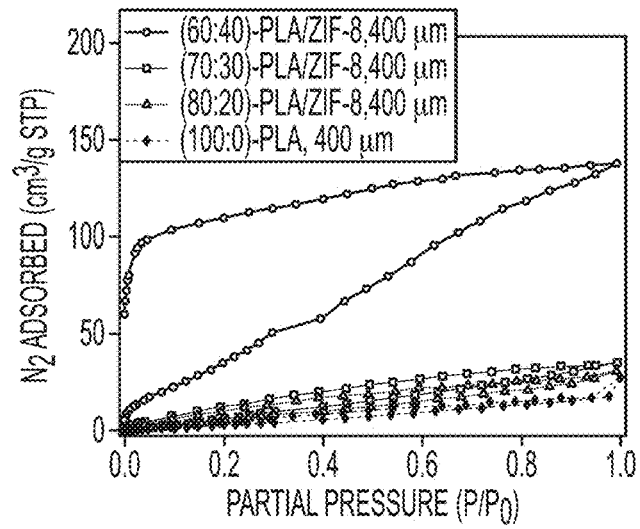

The surface areas (SAs) of extruded and printed ZIF-8/PLA composites, an important metric to further assess the gas accessibility to the MOFs and their presentation within the composites, were determined using the Brunauer-Emmett-Teller (BET) method from nitrogen adsorption experiments at −196° C. Extruded filament (d=1750 μm) with 40% ZIF-8 loading and no other post-processing yielded a low BET surface area (<5 $m^2$ $g^{-1}$). After solvent exchange ($CH_3OH$ soak for 48 hours) and evacuation, higher $N_2$ adsorption occurred, yielding a SA BET of 105 $m^2$ $g^{-1}$ with a slight increase in apparent microporosity (FIGS. 5A-5C). The surface area increased further after the (60:40)-PLA/ZIF-8 filament was printed (d=400 μm) into test strands to 141±27 $m^2$ $g^{-1}$ (avg. of 4 samples) (FIG. 2C). Gas adsorption remained constant relative to that of the larger diameter filament at low partial pressures but increased from p/p 0=0.10-0.30, and a large hysteresis loop in the isotherm was consistently observed. The increased adsorption at relatively larger partial pressures and the hysteresis loop suggests mesopore formation in addition to adsorption within MOF micropores and narrow slit-like pores with irregular shape and size distribution (classified as a H4 hysteresis loop by IUPAC), respectively. Upon solvent exchange and activation, the printed sample's surface area rose dramatically across all partial pressures to SA BET=577 $m^2$ $g^{-1}$. Given the high surface areas, the embedded particles are likely to participate in desirable chemical interactions with target species as 3D-printed materials in a similar fashion to the free powdered MOF. To this end, a printed 400 μm strand was found to adsorb congo red (CR) dye from aqueous solution. ZIF-8 has been previously shown to have a high adsorption capacity for CR in water, due to both the large surface area and strong electrostatic interactions between CR and the surface of the frameworks. A printed strand without added MOFs (i.e. 100% PLA) did not have any visible uptake of CR indicating the presence of the MOF was essential for the interaction. Adsorption of CR in PLA-MOF composite confirms the MOFs unique properties were retained.

Figure 4A:
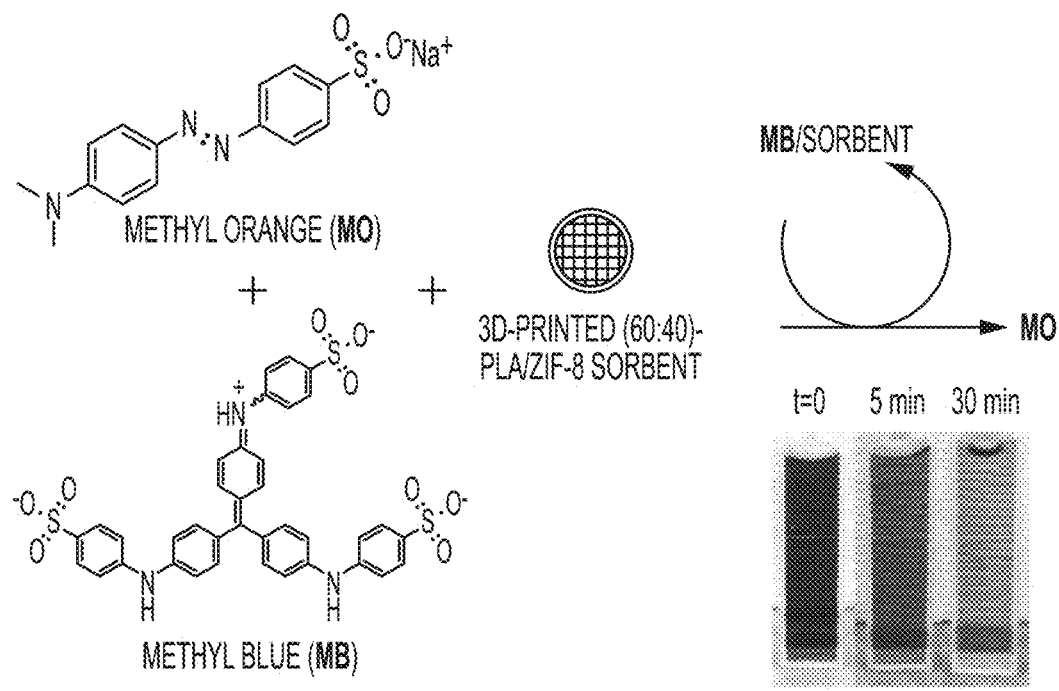
FIGS. 4A and 4B show test-dye adsorption results of a sorbent printed from (60:40)-PLA/ZIF-8 composite filament according to embodiments of the present invention.
Figure 4B:
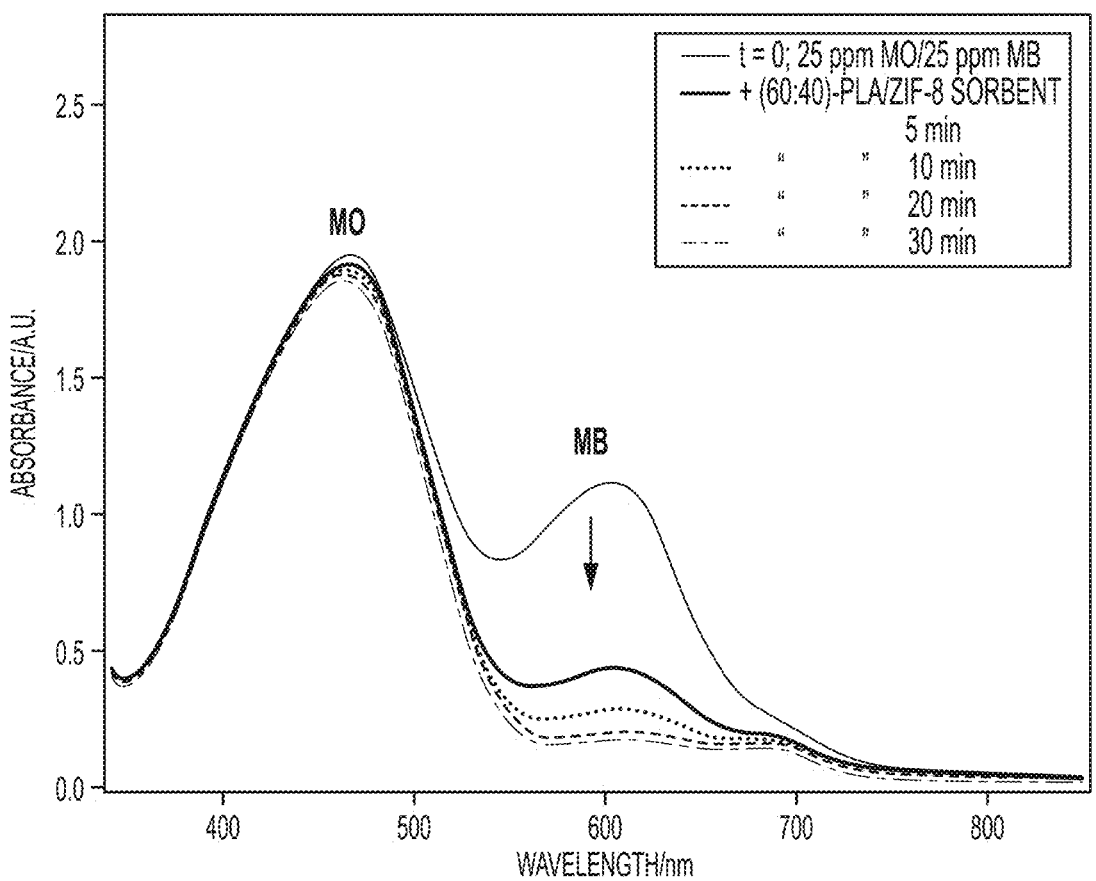

An additional demonstration of MOF functionality in an item printed using the (60:40)-PLA/ZIF-8 composite filament is provided according to the results in FIGS. 4A and 4B. FIG. 4A shows a 3D-printed sorbent placed in a well containing methyl orange and methyl blue test dyes. ZIF-8 is expected to adsorb methyl blue because the test dye molecule is a similar size compared to the micropores of ZIF-08. Methyl orange is a control and is not expected to be adsorbed by the MOF in the composite. At time zero, the initial concentration of both methyl blue and methyl orange (each at 25 ppm) is observable by the dark tone of the liquid. Without agitation, after five minutes, the 3D-printed PLA/ZIF-8 composite sorbent has adsorbed some of the methyl blue and the tone is visibly lighter. After 30 minutes, the solution in the well has become orange because the 3D-printed PLA/ZIF-8 composite sorbent has adsorbed the methyl blue. FIG. 4B is an absorbance spectra corroborating the visual results shown in FIG. 4A. Methyl blue was adsorbed by the 3D-printed PLA/ZIF-8 composite sorbent and the concentration in solution is dramatically decreased even after only five minutes.

Visualization of the activated, printed (60:40)-PLA/ZIF-8 object using HeIM (FIG. 2D-2F) enabled a high-resolution look at the complex internal structure across many length scales without the need for alteration of the native structure (i.e. by sputter coating). Low magnification images (FIG. 2D) show a continuous polymeric structure with giant voids throughout. At intermediate magnifications (FIG. 2E), the large depth of the voids is illustrated and surface roughness due to the presence of the MOF particles is observed. At higher magnifications (FIG. 2F), the MOF particles are more readily observed and, although firmly embedded, are found protruding out from the surface. These images of the composite by HeIM serve to corroborate the $N_2$ adsorption behavior indicative of a hierarchical pore structure.

The formation of the complex internal structure in the printed PLA composites was unexpected. One would reasonably expect that PLA, as well as other rigid matrix polymers, extruded rapidly during the printing of the composite filament may not have sufficient time to fully reorganize around the MOF particles. To address a possible effect of the residence time at the print nozzle and the relationship to the pore network, a (60:40) PLA/ZIF-8 filament feedstock was printed at a wide range of extrusion speeds from 1-186 mm $s^{-1}$, treated with $CH_3OH$, evacuated for activation, and submitted to obtain $N_2$ adsorption isotherms. The print speed over this range was found to have little effect on the total surface area or the features of the isotherm and the average SA across print conditions was 531±36 $m^2$ $g^{-1}$ for printed samples with (60:40)-PLA/ZIF-8 composition. The gas adsorption of the printed strands decreased with lower ZIF-8 loadings (20 and 30%) when fabricated by similar means to the 40% sample (FIGS. 5A-5C). Furthermore, very little hysteresis was observed indicating a lack of porosity in general when compared to the (60:40)-PLA/ZIF-8 material. Relatively high ratios of MOF in PLA, independent of the rate of extrusion through the print nozzle, appear to be a substantial factor for generation of a hierarchical internal structure. Unexpectedly, MOF content below 30% exhibits little to no functionality of the parent MOF. Accordingly, some embodiments comprise greater than or equal to 30%, 35%, 40%, 45%, or 50% MOF by mass.

Figure 2D:
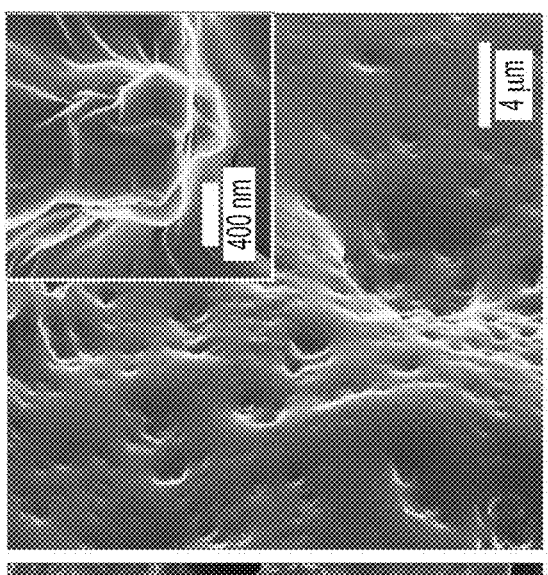
Figure 2E:
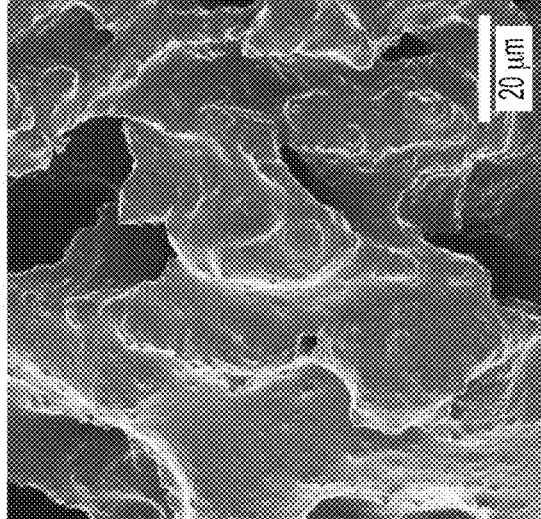
Figure 2F:
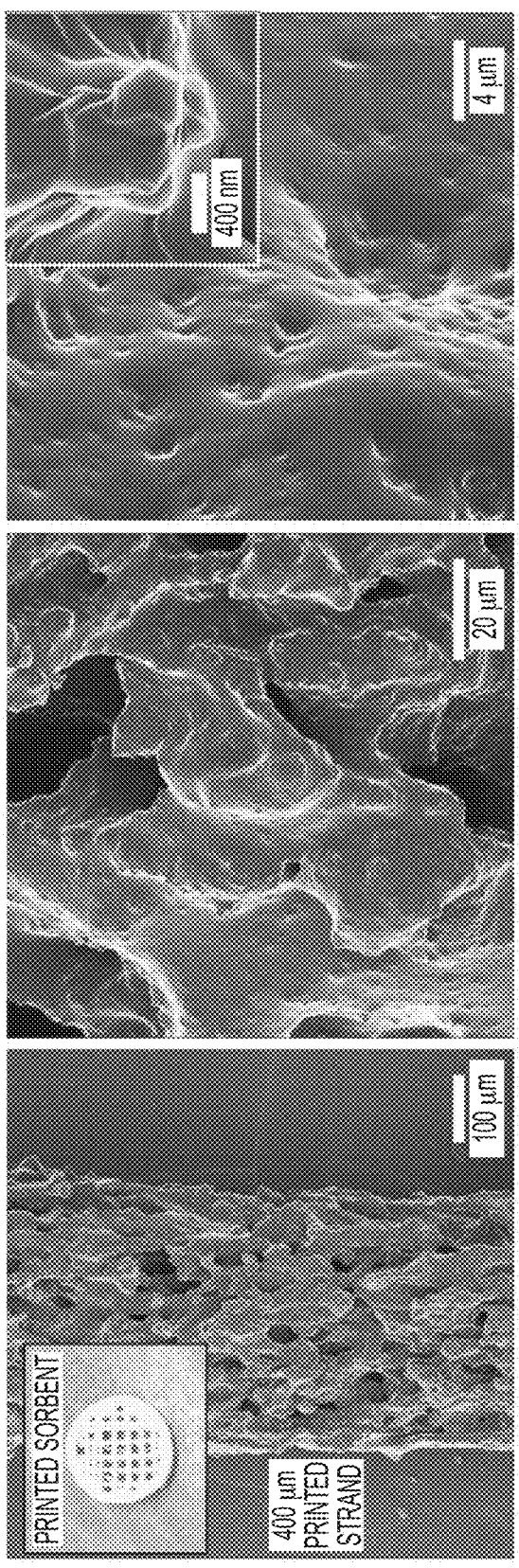

PLA/ZIF-8 based composite formulations are promising in that they can be reproducibly processed, printed up to loadings of at least 40% MOF by mass to yield large surface areas, and participate in chemical interactions as if they were free powders as demonstrated by their ability to undergo solvent exchange in the pores of ZIF-8 and to uptake a test-dye. The materials can be routinely handled and fabricated into complex devices such as a "waffle" shaped sorbent (FIG. 2D, inset). The filament was compatible with the pinch-roller mechanism of a common FDM printer and further optimization with a modified extrusion mechanism (i.e. pre-softening of the filament, belt-feed, etc.) may be further employed to help access larger-scale devices.

3D printing and characterization of flexible polymer-MOF composites

ZIF-8 composites were processed into FFF composite filaments with TPU base polymer matrices. TPUs can demonstrate substantial flexibility by sustaining up to 600% elongation while simultaneously retaining structural stability with a shore hardness of 98 A. Applying the methods of making described herein to a non-rigid matrix polymer shows the methods' versatility. TPU-based 3D printing, although less established than PLA or ABS matrices for FDM, offers a significant advantage of high flexibility that if conferred to a MOF composite could be useful in device fabrication. A TPU (e.g., Ninjatek Semiflex®) stock solution (0.1 g mL$^{-1}$) was prepared by dissolving TPU filament (5.0 g) in DMF (50 mL) while stirring at 55° C. Upon dissolution, the stock solution was stored at room temperature. A typical composite with a total mass of 2 g and ZIF-8 loading of 40% by mass was achieved first by dispersing ZIF-8 (800 mg) in acetone (15 mL) by bath sonication for 15 min. The TPU stock solution (24 mL) was then added to the MOF solution, blended, cast, then dried as with the PLA-MOF composite.

Ternary composites can also be made. In some embodiments, in addition to the matrix polymer and the MOF, a sacrificial polymer is included to affect the internal structure and porosity of the composite filament. For a composite with composition (50:40:10)-Semiflex/ZIF-8/PVDF-HFP and a total mass of 2 g, ZIF-8 was first dispersed in acetone by bath sonication for 10 min. A PVDF-HFP stock solution (0.1 g mL$^{-1}$ in DMF, 2 mL) was added to the MOF solution and blended by bath sonication for 10 min. The PVDF-HFP is a sacrificial polymer. Lastly, a Semiflex solution (0.1 g mL$^{-1}$ in DMF) was added to the ZIF-8/PVDF-HFP mixture, stirred by gently shaking the mixture (~1 min), then blended by ultrasonic horn for 10 min. The composite was cast and dried as above. Unexpectedly, Semiflex composites without MOF, with composition of (80:20)-Semiflex/PVDF-HFP, exhibited excessive swelling prohibiting access to printable filament material. The control experiment result provides support for high MOF filler ratios contributing in the reduction of die swell when working with PVDF-HFP.

Post-printing treatment was applied to remove the sacrificial polymer. Removal of PVDF-HFP from Semiflex/ZIF-8/PVDF-HFP composites was performed by submerging the material in boiling acetone for 10 min, removing the acetone, washing the material with deionized water (3×), and drying the sample in a low vacuum oven as with the activation procedure. The procedure for solvent exchange and activation of the TPU-based composite filaments was similar to that for the PLA-based composite filaments.

Semiflex/ZIF-8 composites were prepared and successfully extruded into filament feedstocks with ZIF-8 loadings as high as 50% wt. The Semiflex/ZIF-8 composite filament retained high flexibility even with these high loadings and PXRD experiments confirmed that the Zn-framework particles remained highly crystalline after processing (FIG. 7). TGA analysis recorded on a standard printed strand of (60:40)-Semiflex/ZIF-8 indicated a large quantity of solvent guests (expected to be acetone and/or DMF from the preparation steps) retained in the pores of the composites after processing which were exchanged with $CH_3OH$, and subsequently removed by evacuation (FIG. 6A).

Printed binary composites of Semiflex/ZIF-8 were observed to have low specific surface areas (68 m$^2$ g$^{-1}$ at 50% ZIF-8 loading) only slightly larger than that of printed Semiflex without any MOF loaded as determined from $N_2$ adsorption experiments. The surface area increased marginally after $CH_3OH$ solvent exchange treatment to 98 m$^2$ g$^{-1}$ at 50% ZIF-8 loading (FIG. 6B). The gas adsorption experiments suggested a majority of the pores of the MOF particles in these binary composites were occluded by TPU and were not merely filled with guest solvents. In contrast to PLA/ZIF-8 composites, little hysteresis was observed and minimal gas uptake indicative of mesopores was found, further indicating that the larger void features and hierarchical pore formation were unique to the more rigid PLA matrix at high MOF loading.

Figure 6A:
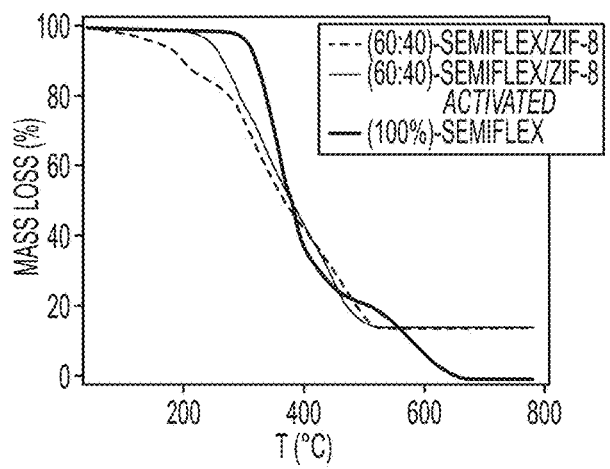
FIGS. 6A-6D include (FIG. 6A) TGA data (5° C. $min^{-1}$, in air) of (100%)-Semiflex, as printed (60:40)-Semiflex/ZIF-8 item, and after activation by $CH_3OH$ treatment and evacuation as 400 μm printed strands.
Figure 6B:
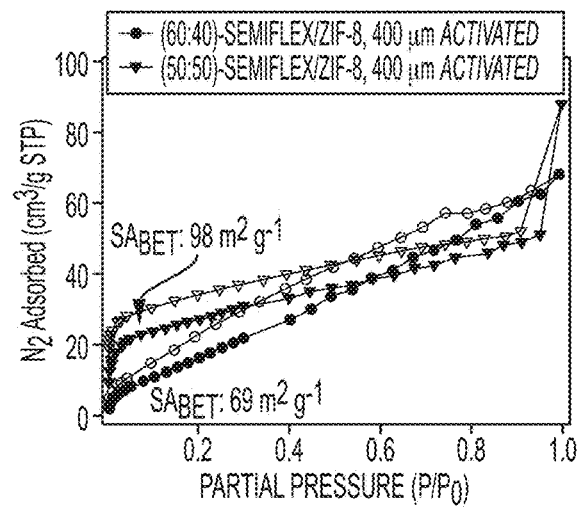
Figure 6C:
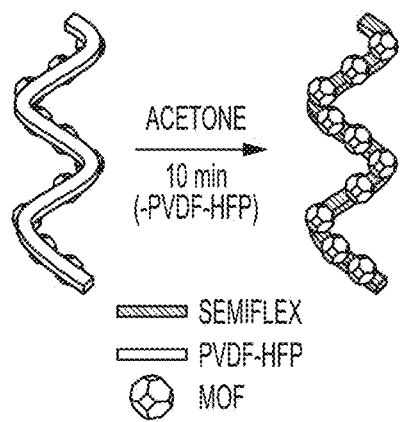
Figure 6D:
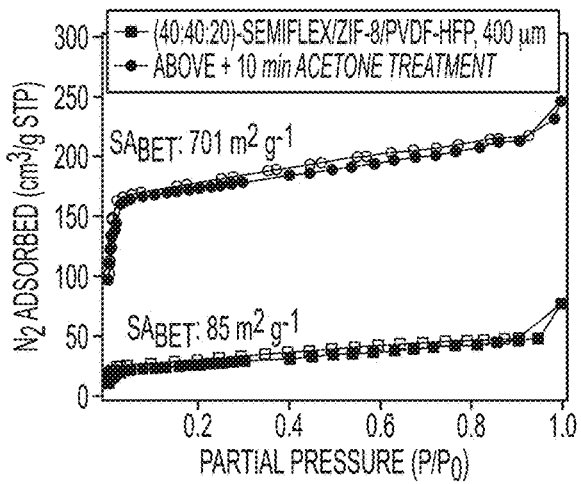
Figure 7:
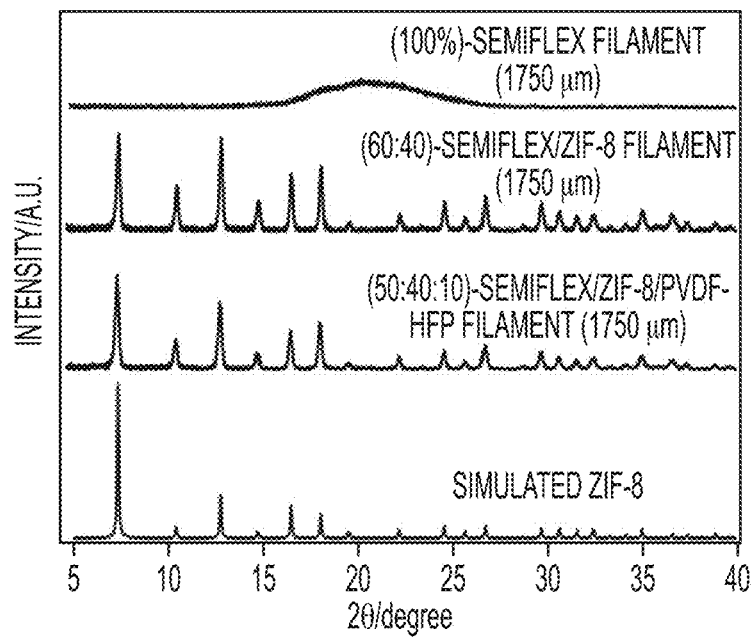
FIG. 7 shows PXRD data for a 100% Semiflex filament, (60:40)-Semiflex/ZIF-8 filament, (50:40:10)-Semiflex/ZIF-8/PVDF-HFP, and the simulated diffraction pattern for ZIF-8 from single crystal data.
Figure 8:
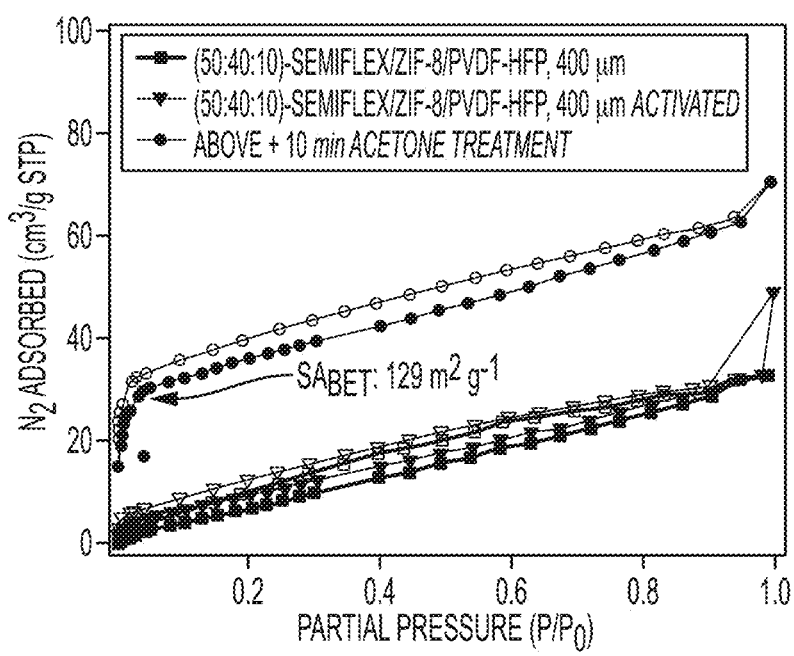
FIG. 8 includes nitrogen adsorption isotherms recorded at −196° C. for (50:40:10)-Semiflex/ZIF-8/PVDF-HFP as-printed at 400 μm, after activation by $CH_3OH$ treatment, and after activation by $CH_3OH$ treatment followed by acetone treatment.
Figure 9A:
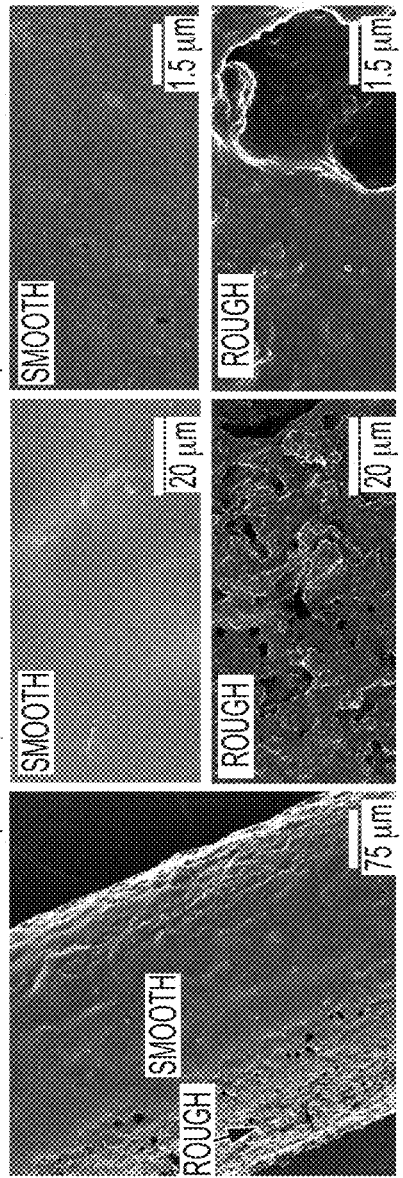
FIGS. 9A-9B contain HeIM micrographs of (FIG. 9A) (50:40:10)-Semiflex/ZIF-8/PVDF-HFP printed at 400 μm diameter of (left to right) a low-magnification image indicating smoother and rougher regions, intermediate-magnification, and higher magnifications in each area. ZIF-8 crystallites were observed more in the rougher regions and primarily deeply embedded.
Figure 9B:
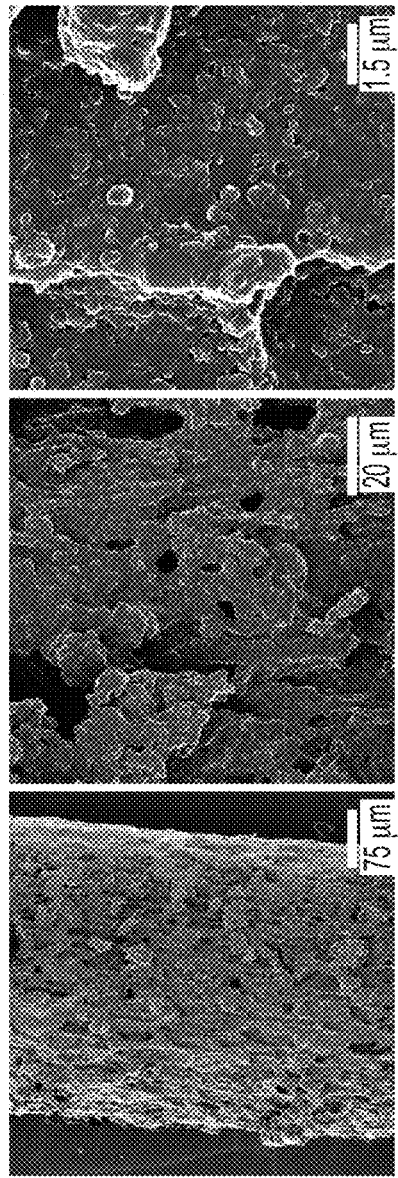

To increase the specific surface area and exposure of the pores within embedded MOF crystals in the Semiflex matrix, a second highly flexible fluoropolymer was introduced to form a Semiflex/ZIF-8/PVDF-HFP ternary composite (FIG. 6A). The fluoropolymer was maintained throughout processing and printing, then removed by solvent-leaching to produce internal free-space without altering the final object's macrostructure (FIG. 6C). To facilitate this process, poly(vinylidene-co-hexafluoropropylene) (PVDF-HFP) was added to pre-dispersed ZIF-8 to encourage the "priming" or coating of the crystals with this sacrificial polymer, prior to addition of the Semiflex material. PVDF-HFP was selected as it highly miscible with TPU (i.e. does not phase separate when blended) and for its solubility characteristics to enable selective removal after printing. PVDF-HFP was blended in at 10 and 20% loadings to yield ternary filament feedstocks of compositions (50:40:10)- and (40:40:20)-Semiflex/ZIF8/PVDF-HFP. Pure PVDF-HFP has a tendency for excessive swelling during extrusion, however given the ease of inclusion to the composites in this study, the very high MOF filler ratios are thought to suppress this swelling behavior and therefore contribute to more favorable extrusion behavior Initially, the printed and untreated Semiflex/ZIF-8 composites with PVDF-HFP incorporated had similarly poor $N_2$ adsorption characteristics to the binary composites, where 10% PVDF-HFP yielded SA BET=32 m$^2$ g$^{-1}$ (FIG. 8) and 20% PVDF-HFP loading contributed to a SA BET=85 m$^2$ g$^{-1}$ (FIG. 6D). Solvent exchange with $CH_3OH$ for activation again had little effect on the gas adsorption properties (FIG. 8). The samples were then treated by soaking in hot acetone for 10 min to dissolve soluble PVDF-HFP segments broadly in the filament and more specifically the polymer directly occluding the MOF pores, rinsed with $H_2O$, and fully dried. The acetone treatment had no observable effect on Semiflex with these treatment conditions and there were no observed changes in the macrostructural integrity of the printed pieces (Supplementary FIGS. 9 and 10). The reduction in areas of smoother surface (see FIG. 9B) suggests those regions were PVDF-HFP rich. As a result of treatment, the MOF crystallites increase in exposure at the surface, although to a lesser extent than the 20% PVDF-HFP where more (sub)micron etching was observed and the surface area increase with treatment was significantly larger. The ability of acetone to remove the PVDF-HFP selectively was confirmed by elemental analysis of % F content using the ion selective electrode technique on printed materials. For a (40:40:20) Semiflex/ZIF-8/PVDF-HFP composite, F content was reduced by 59% (from 10.23% as printed to 4.21% after treatment). As a consequence of this treatment step, the surface area of objects with 20% PVDF-HFP content originally, and a post-treatment ~45% ZIF-8 loading increased dramatically to 706 m$^2$ g$^{-1}$ (average from two different filament spools: 701, 712 m$^2$ g$^{-1}$) and the adsorption behavior was clearly that of Type I classification reflecting the typical microporous nature of ZIF-8 (FIG. 6D). The surface area with an original PVDF-HFP content of 10% after treatment increased less dramatically (from 32 m$^2$ g$^{-1}$ to 129 m$^2$ g$^{-1}$, FIG. 8). Accordingly, in some embodiments, a sacrificial polymer (e.g., PVDF-HFP) concentration above 10% can improve the surface area of composite filaments and yield MOFs with a large extent of exposed micropores.

Figure 11B:
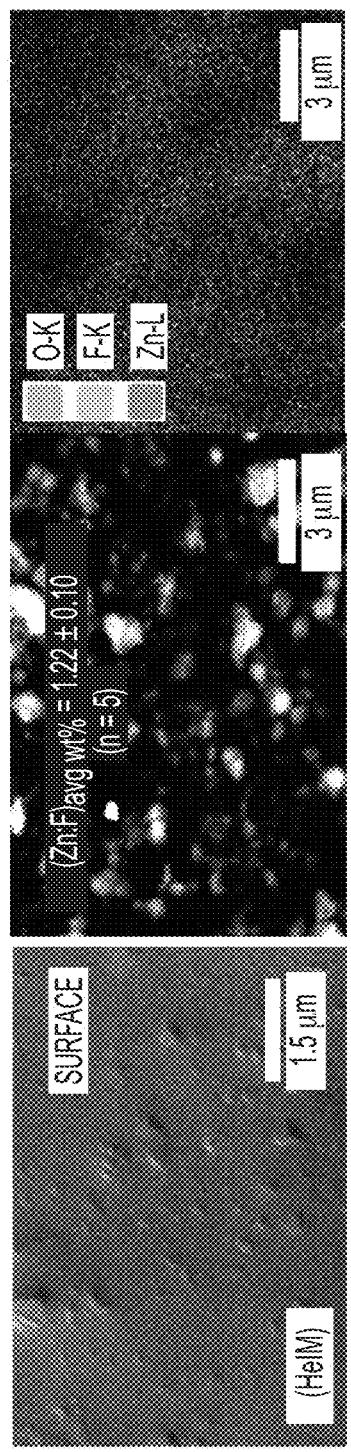
FIGS. 11A-11F include (FIG. 11A) schematic of 400 μm diameter printed (40:40:20)-Semiflex/ZIF-8/PVDF-HFP with (FIG. 11B) HeIM image of the surface and BSE image and corresponding EDS map of O, F, and Zn elements.
Figure 11C:
Figure 11A:
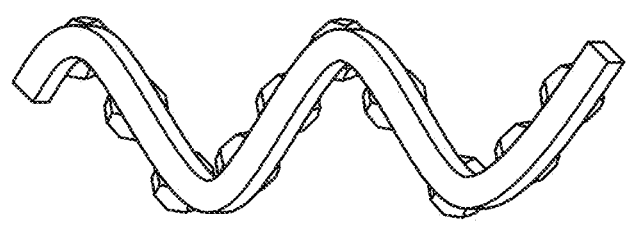
Figure 11E:
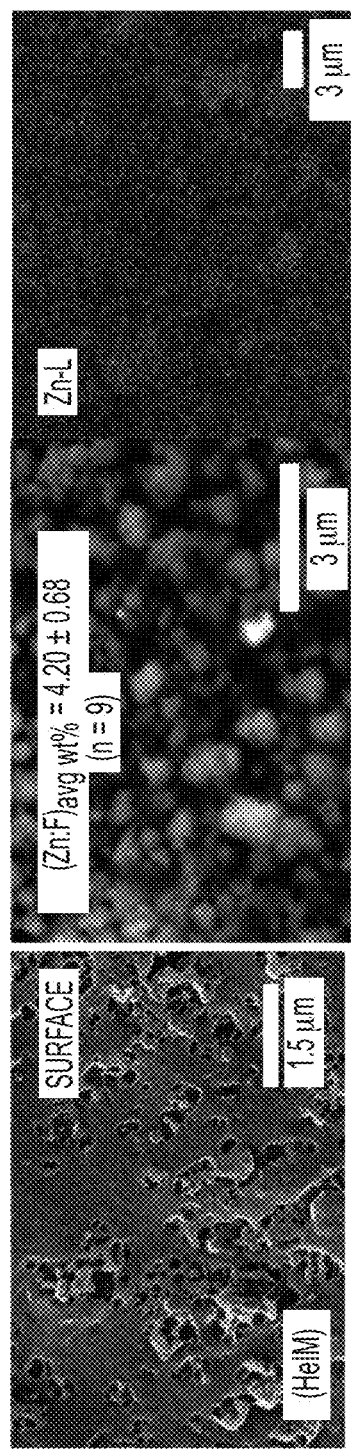
Figure 11F:
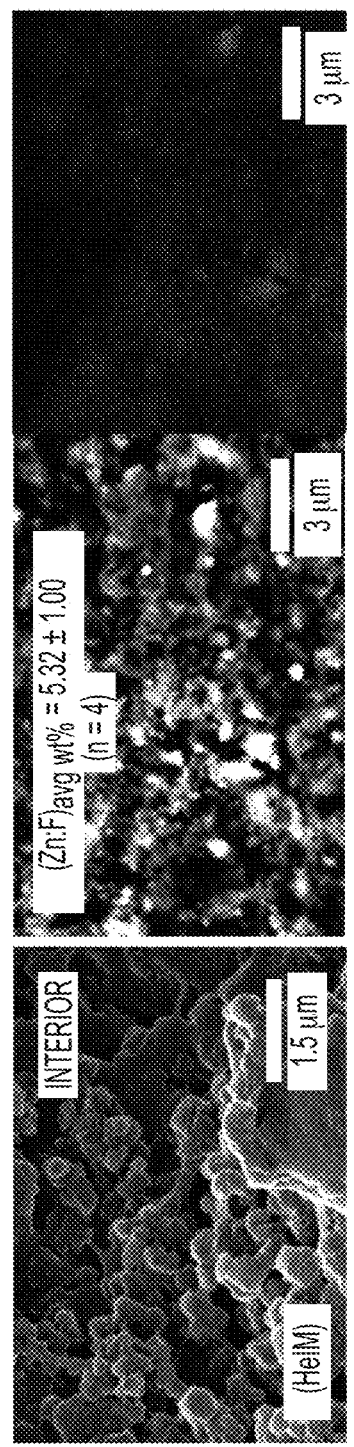
Figure 11D:
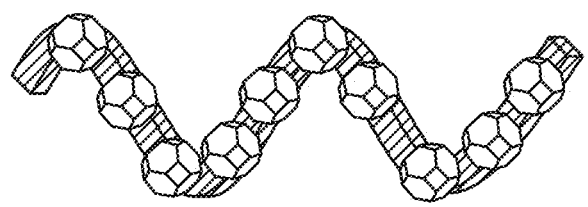

The macro- and micro-structure on the surface and the interior of the as-printed (40:40:20)-Semiflex/ZIF-8/PVDF-HFP and after acetone treatment was further examined by HeIM (in some cases scanning electron microscopy (SEM)) with accompanying elemental mapping (FIG. 11) to understand how the sacrificial fluoropolymer improved the access to the MOF micropores to such a large extent. While some surface roughness and larger voids were observed in the as printed, untreated object, macrovoids were not prominent in the composites as were found with the PLA at similar ZIF-8 filler ratios. At higher magnification, the ZIF-8 crystals were found to be covered in polymer at the surface (FIG. 11B) and throughout the interior (FIG. 11C) as observed in cross-sections of the printed objects. Representative backscatter electron (BSE) images show distribution of heavier nuclei (Zn of ZIF-8) throughout the material. Mapping of the same areas by energy dispersive X-ray spectroscopy (EDS) revealed a uniform distribution of F (from PVDF-HFP) at the surface amidst the TPU matrix (represented by O) and embedded ZIF-8 (represented by Zn) particles. However, in the interior of the printed material some phase separation was consistently observed (FIG. 11C). The Zn:F avg wt % ratio across multiple large areas of the printed object was significantly lower at the surface (1.22±0.10) than the interior (3.73±2.34). A lower Zn:F ratio and significantly reduced standard deviation over many areas confirms that the sacrificial PVDF-HFP is both in greater concentration and is more uniform at the surface relative to the interior sections. While TPU and PVDF-HFP are known to be highly miscible during casting into a film from solution, it is established that fluoropolymer additives when dispersed in molten thermoplastic will migrate to some extent to the outside of a composite during extrusion.

The approach to first "prime" the MOF crystals with PVDF-HFP prior to incorporation into the Semiflex matrix and the resulting higher relative concentration at the surface in the ternary composites helped enable rapid exposure of the MOFs post-printing. The dissolution and removal of ~59% PVDF-HFP in the sample results in widespread micron to submicron scale-etching of the surface. MOF particles appear intertwined through the remaining polymeric matrix at the surface (FIG. 11E) and are highly prominent in the interior (FIG. 11F) where the composite resembles a "loosely packed" (i.e. with limited polymer observed) morphology. The Zn:F ratio after treatment increased both at the surface and the interior but the increase was disproportionally higher at the surface, indicating, not surprisingly, more of the PVDF-HFP loss occurred from surface sections on the object. Importantly, Zn was found uniformly throughout the printed objects.

Figure 12:
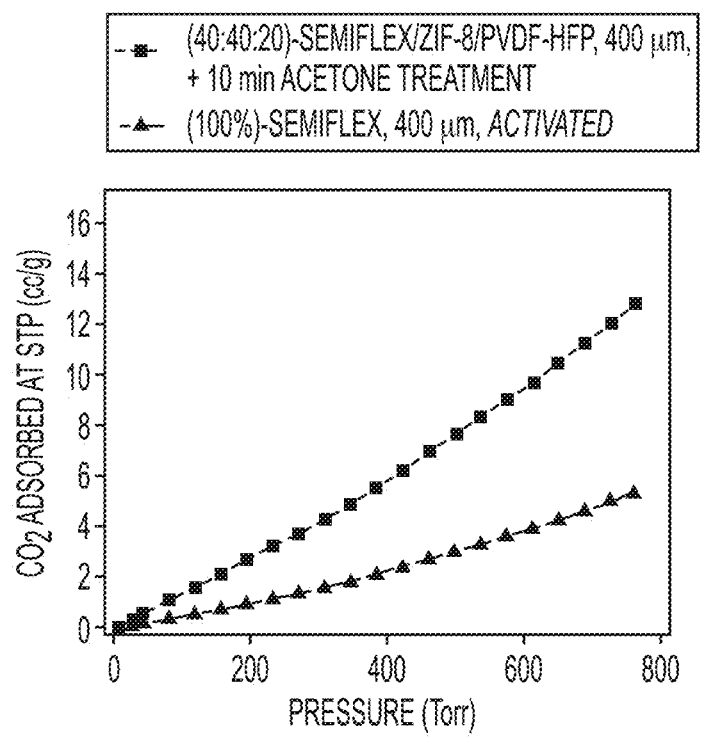
FIG. 12 is a graph of $CO_2$ adsorption isotherms up to 1 bar recorded at 298 K for 400 μm diameter printed (100%)-Semiflex and (40:40:20)-Semiflex/ZIF-8/PVDF-HFP after acetone treatment.
Figure 13:
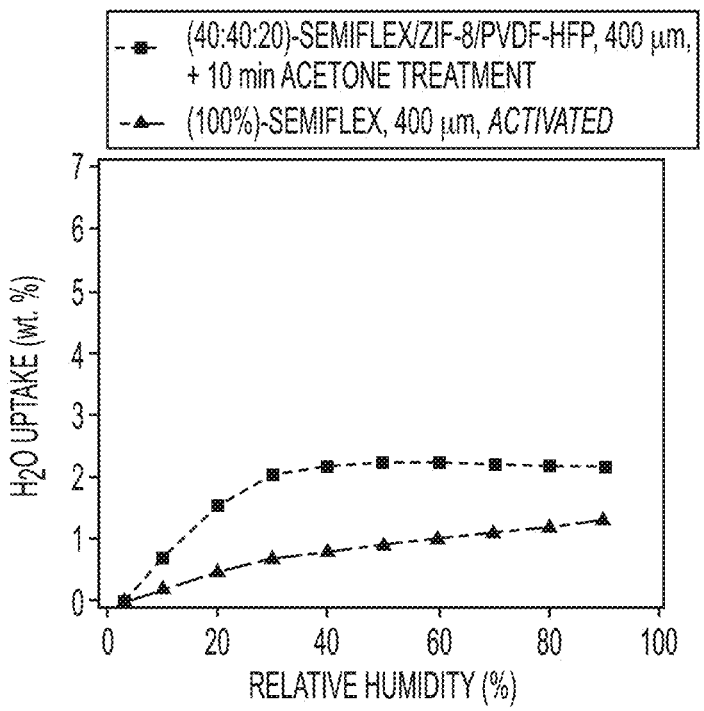
FIG. 13 is a graph of $H_2O$ adsorption isotherms up to 90% relative humidity for 400 μm diameter printed (100%)-Semiflex and (40:40:20)-Semiflex/ZIF-8/PVDF-HFP after acetone treatment.

The chemistry of the MOFs within the printed Semiflex composites was further assessed. $CO_2$ sorption in the post-acetone treated Semiflex/ZIF-8/PVDF-HFP sample, measured at pressures up to 1 bar at 298 K, increased significantly over a (100%)-Semiflex sample printed control (FIG. 12) as the pressure increased, which is behavior typical of native ZIF-8 as a powder. ZIF-8 is known to be hydrophobic and does not absorb significant quantities of water. With the Semiflex/ZIF-8/PVDF-HFP composite, only a slight increase in $H_2O$ adsorption was observed over the (100%)-Semiflex control despite the massive increase in surface area (FIG. 13), again suggesting preservation of typical ZIF-8 characteristics. In total, the addition of fluoropolymer additive and removal after printing is effective at yielding an object with improved mechanical properties, high surface areas, and retention of the MOFs known chemical interactions.

Figure 14A:
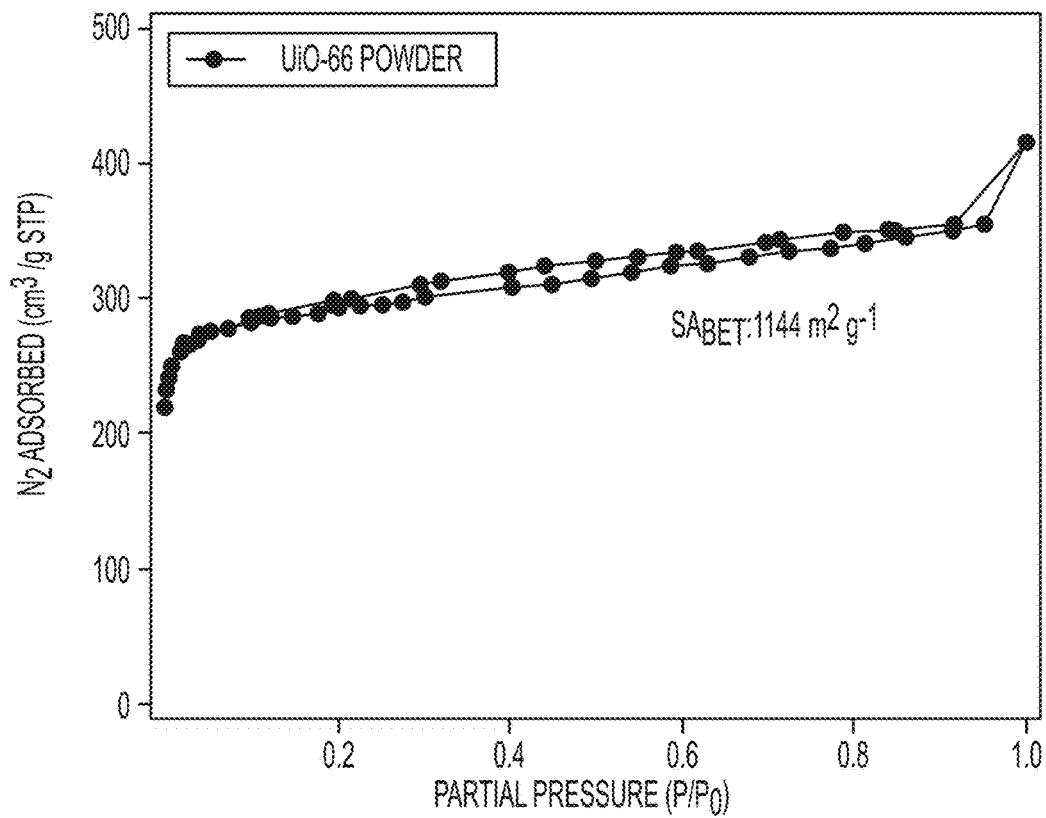
FIGS. 14A and 14B include nitrogen adsorption isotherms recorded at −196° C. for (FIG. 14A) UiO-66 MOF powder and (FIG. 14B) (40:40:20) Semiflex/UiO-66/PVDF-HFP printed at a diameter of 400 μm, and after 10 min acetone treatment.
Figure 14B:
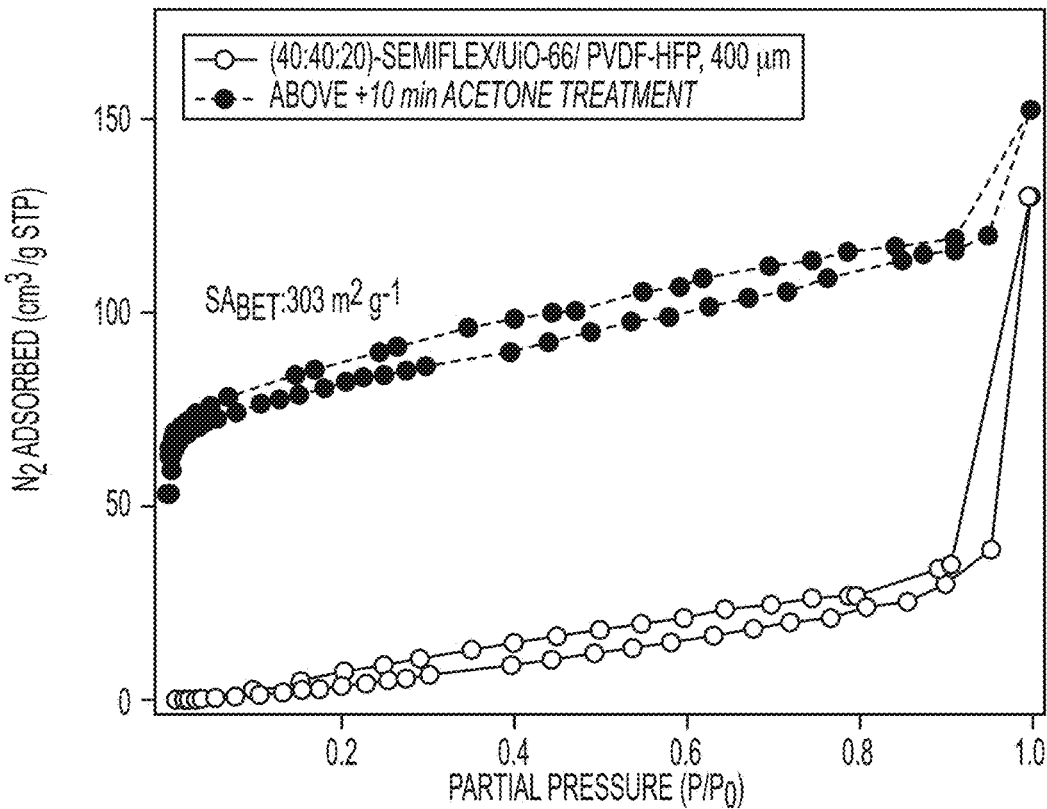
Figure 15A:
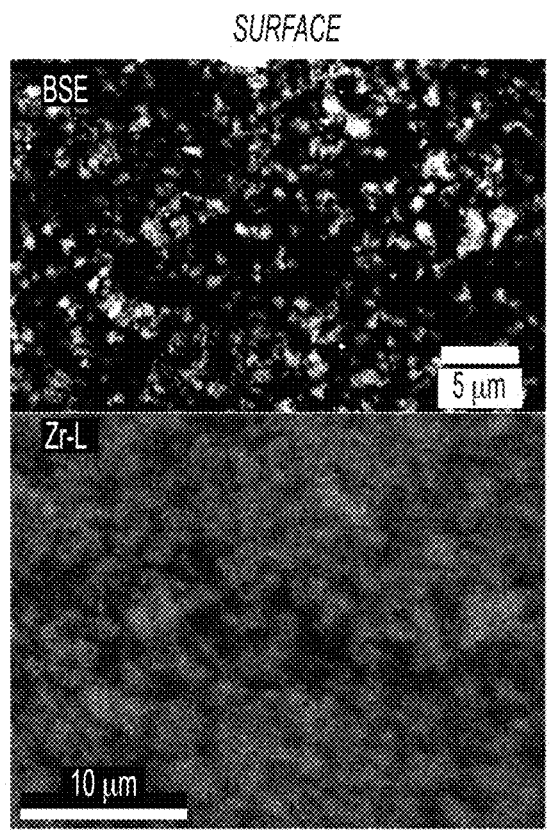
FIGS. 15A and 15B include images of (FIG. 15A) back-scattering electron (BSE) images of (40:40:20)-semiflex/UiO-66/PVDFHP after 10 minute treatment at the surface with associated Zr distribution obtained by EDS mapping and (FIG. 15B) SEM images of the same cross-sectioned with associated BSE image and Zr distribution over the same area.
Figure 15B:
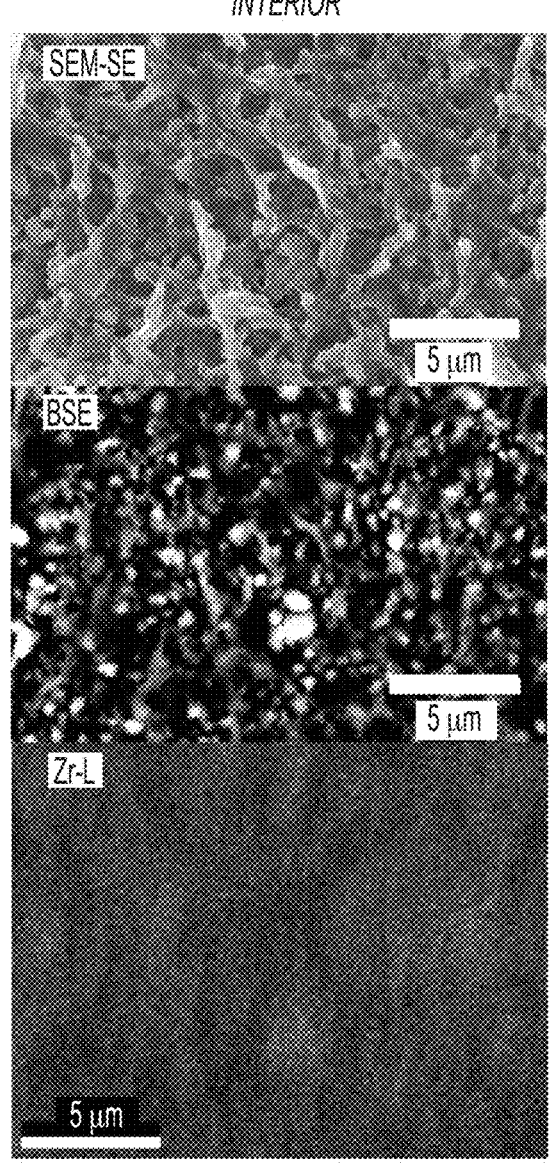

The method of formulating a ternary polymer-MOF composite filament, printing, removing the sacrificial polymer, and retaining a high surface-area can be extended to other types of MOFs. UiO-66, a versatile framework comprised of Zr centers with 1,4 benzenedicarboxylate linkers and a measured surface area of 1144 $m^2$ $g^{-1}$ was formulated into a filament with composition (40:40:20)-Semiflex/UiO-66/PVDF-HFP without any modification of the procedure (used for ZIF-8) and was readily printed. After acetone treatment, the surface area was 303 $m^2$ $g^{-1}$ and the microporous character within the composite, which was absent prior to sacrificial polymer removal (FIGS. 14A and 14B), was restored. Furthermore, the Zr-MOF was found uniformly on the surface and in the interior of the printed material as shown by backscattering electron imaging (FIGS. 15A-15B).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A method of synthesizing a FFF composite filament, the method comprising:
   mixing a sacrificial polymer solution in a sacrificial polymer solvent in a suspension that comprises a MOF with a matrix polymer solution that comprises a matrix polymer in a matrix polymer solvent to yield a polymer-MOF mixture and wherein the sacrificial polymer solution and the matrix polymer solution are at least partially miscible with one another;
   casting and drying the polymer-MOF mixture into a solid composite material;
   forming the solid composite material into a FFF composite filament comprising the MOF in an amount greater than 10% by mass and
   selectively removing the sacrificial polymer from the FFF composite filament or from an item printed from the FFF composite filament.

2. The method of claim 1, wherein said removing comprises dissolving the sacrificial polymer with a sacrificial polymer removal solvent in which the solubility of the sacrificial polymer is greater than the solubility of the matrix polymer.

3. The method of claim 1, wherein the sacrificial polymer comprises a fluoropolymer.

4. The method of claim 1, wherein the solid composite material comprises greater than 10% sacrificial polymer by mass.

5. The method of claim 1, further comprising:
   replacing at least a portion of residual solvent that remains in pores of the FFF composite filament, or an item printed from the FFF composite filament, with an exchange solvent having a boiling temperature that is less than that of the residual solvent; and
   evaporating the exchange solvent from the pores and activating chemical functionality of the MOF.

6. The method of claim 5, wherein after said evaporating, the FFF composite filament, or an item printed from the FFF composite filament, has a surface area greater than or equal to 250 $m^2/g$.

7. The method of claim 1, wherein the FFF composite filament comprises the MOF in an amount greater than 25% by mass.

8. The method of claim 1, wherein the FFF composite filament comprises the matrix polymer in an amount greater than 15% by mass.

9. The method of claim 1, wherein the matrix polymer comprises polylactic acid, thermoplastic polyurethane, acrylonitrile butadiene styrene, nylon 12, nylon 66, polyvinylidene difluoride, polycarbonate, or a combination thereof.

10. The method of claim 1, wherein the MOF comprises ZIF-08, UiO-66, MIL-101(Cr), FeBTC, or a combination thereof.

11. The method of claim 1, wherein the FFF composite filament has a surface area greater than or equal to 2.5 $m^2/g$.

12. The method of claim 1, wherein said forming comprises providing the solid composite material to an extruder and pressing the material through a die to yield the FFF composite filament.

* * * * *